US007603270B2

(12) United States Patent
Mossakowski

(10) Patent No.: US 7,603,270 B2
(45) Date of Patent: Oct. 13, 2009

(54) METHOD OF PRIORITIZING TRANSMISSION OF SPECTRAL COMPONENTS OF AUDIO SIGNALS

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 229 days.

(21) Appl. No.: 10/520,000

(22) PCT Filed: Jul. 7, 2003

(86) PCT No.: PCT/DE03/02258

§ 371 (c)(1), (2), (4) Date: Aug. 5, 2005

(87) PCT Pub. No.: WO2004/006224

PCT Pub. Date: Jan. 15, 2004

(65) Prior Publication Data

US 2006/0015346 A1 Jan. 19, 2006

(30) Foreign Application Priority Data

Jul. 8, 2002 (DE) ................................ 102 30 809

(51) Int. Cl.
*G10L 19/02* (2006.01)
*G10L 21/00* (2006.01)
*H04B 1/66* (2006.01)

(52) U.S. Cl. ........................ 704/201; 704/205; 704/500

(58) Field of Classification Search ................. 704/201, 704/205, 500, 501; 709/240; 370/444
See application file for complete search history.

(56) References Cited

U.S. PATENT DOCUMENTS 5,253,326 A * 10/1993 Yong .......................... 704/200
5,517,511 A * 5/1996 Hardwick et al. ........... 714/755
5,583,967 A * 12/1996 Akagiri ................... 704/200.1
5,675,705 A * 10/1997 Singhal ...................... 704/254
5,886,276 A * 3/1999 Levine et al. ................. 84/603
6,038,369 A * 3/2000 Imai ............................ 386/95
6,138,093 A * 10/2000 Ekudden et al. ............. 704/228
6,144,937 A * 11/2000 Ali ............................. 704/233
6,584,509 B2 * 6/2003 Putzolu ...................... 709/240
6,952,669 B2 * 10/2005 Hutchins .................... 704/207
7,079,658 B2 * 7/2006 Lapicque ..................... 381/17
7,130,347 B2 * 10/2006 Mossakowski ......... 375/240.01
7,136,418 B2 * 11/2006 Atlas et al. .................. 375/242
7,184,961 B2 * 2/2007 Sato ........................... 704/501
7,343,292 B2 * 3/2008 Takamizawa et al. ....... 704/501
7,359,560 B2 * 4/2008 Mossakowski .............. 382/240
7,359,979 B2 * 4/2008 Gentle et al. ................ 709/231
7,444,023 B2 * 10/2008 Mossakowski .............. 382/232
7,515,757 B2 * 4/2009 Mossakowski .............. 382/232
2003/0019348 A1 * 1/2003 Tasaki ......................... 84/655
2003/0236674 A1 * 12/2003 Henry, Jr. ................... 704/500

OTHER PUBLICATIONS

Rahardja et al., “Perceptually Prioritized Bit-Plane Coding for High-Definition Advanced Audio Coding,” Eighth IEEE International Symposium on Multimedia (ISM ’06), Dec. 2006, pp. 245 to 252.*
J. Korhonen, “Error robustness scheme for perceptually coded audio based on interframe shuffling of samples,” Proceeding IEEE International Conference on Acoustics, Speech, and Signal Processing, 2002, May 13, 2002 to May 17, 2002, vol. 2, pp. 2053 to 2056.*
Babich et al., “Source-Matched Channel Coding and Networking Techniques for Mobile Communications,” The 8th IEEE International Symposium on Personal, Indoor and Mobile Radio Communications, 1997, Sep. 1-4, 1997, vol. 2, pp. 704 to 708.*
“Spectral Density”, Definition from Wikipedia, 5 Pages.*
Tsutsui et al., “ATRAC: Adaptive Transform Acoustic Coding for MiniDisc”, Audio Engineering Society, Oct. 1-4, 1992, 13 Pages.*

* cited by examiner

*Primary Examiner*—Martin Lerner
(74) *Attorney, Agent, or Firm*—Lackenbach Siegel LLP; Myron Greenspan

(57) ABSTRACT

A method for the transmission of audio signals between a transmitter and at least one receiver operates according to the prioritizing pixel transmission method. The audio signal is first broken down into a number of spectral fractions. The broken-down audio signal is stored in a two-dimensional array with a plurality of fields. The dimensions to be registered in the field are frequency and time; the value to be registered in the field is amplitude. Groups are then formed from the individual fields and a priority is assigned to the individual groups, in which the priority will be gauged as higher if the amplitudes of the group values are higher, and/or if the amplitude differences of the values of one group are higher, and/or if the groups are closer to actual time. Finally, the groups are transmitted to the receiver according to the order of their established priority.

9 Claims, No Drawings

METHOD OF PRIORITIZING TRANSMISSION OF SPECTRAL COMPONENTS OF AUDIO SIGNALS

The invention relates to a method of prioritizing transmission of spectral components of audio signals.

Currently a multiplicity of methods exists for the compressed transmission of audio signals. Essentially the following methods are among them:

- Reduction of the sampling rate, for example 3 kHz instead of 44 kHz
- Nonlinear transmission of the sampled values, for example in ISDN transmission
- Utilization of previously stored acoustic sequences, for example MIDI or voice simulation
- Employing Markov models for the correction of transmission errors.

The commonalities of the known methods reside therein that even at lower transmission rates satisfactory voice intelligibility is still provided. This is substantially attained through the formation of mean values. However, different voices of the source yield similarly sounding voices in the lowering, such that, for example voice fluctuations, which are detectable in normal conversation, are no longer transmitted. This results in a marked restriction in the quality of communication.

Methods for compressing and decompressing of image or video data by means of prioritized pixel transmission are described in the applications DE 101 13 880.6 (corresponding to PCT/DE02/00987), now issued as U.S. Pat. No. 7,130,347 and DE 101 52 612.1 (corresponding to PCT/DE02/00995). now issued as U.S. Pat. No. 7,359,560. In these methods, for example digital image or video data are processed, which are comprised of an array of individual pixels, each pixel comprising a pixel value varying in time, which describes color or brightness information of the pixel. According to the invention, to each pixel or each pixel group a priority is assigned and the pixels are stored corresponding to their prioritization in a priority array. This array contains at each point in time the pixel values sorted according to prioritization. These pixels and the pixel values utilized for the calculation of the prioritization are transmitted or stored corresponding to the prioritization. A pixel receives a high priority if the differences to its adjacent pixels are very large. For the reconstruction the particular current pixel values are represented on the display. The pixels not yet transmitted are calculated from the already transmitted pixels. These methods can in principle also be utilized for the transmission of audio signals.

The invention therefore has at its aim to specify a method for transmitting audio signals, which operates with minimum losses even at low transmission bandwidths.

According to the invention the audio signal is first resolved into a number n of spectral components. The resolved audio signal is stored in a two-dimensional array with a multiplicity of fields, with frequency and time as the dimensions and the amplitude as the particular value to be entered in the field. Subsequently from each individual field and at least two fields adjacent to this field of the array, groups are formed, and to the individual groups a priority is assigned, the priority of a group being selected higher the greater the amplitudes of the group values are and/or the greater the amplitude differences of the values of a group are and/or the closer the group is to the current time. Lastly, the groups are transmitted to the receiver in the sequence of their priority.

The new method essentially rests on the foundations of Shannon. According to them, the signals can be transmitted free of loss if they are sampled at the twofold frequency. This means that the sound can be resolved into individual sinusoidal oscillations of different amplitude and frequency. Accordingly, the acoustic signals can be unambiguously restored without losses by transmitting the individual frequency components, including amplitudes and phases. Herein is in particular utilized that the frequently occurring sound sources, for example musical instruments or the human voice, are comprised of resonance bodies, whose resonant frequency does not change at all or only slowly.

Advantageous embodiments and further developments of the invention are specified in the dependent patent claims.

An embodiment example of the invention will be described in the following. Reference shall be made in particular also to the specification and the drawing of the earlier patent applications DE 101 13 880.6 and DE 101 52 612.1. The two aforementioned applications have been used as U.S. Pat. Nos. 7,130,347 and 7,359,560, respectively, and these U.S. Patents are incorporated by reference as if fully set forth herein.

First, the sound is picked up, converted into electric signals and resolved into its frequency components. This can be carried out either through FFT (Fast Fourier Transformation) or through n-discrete frequency-selective filters. If n-discrete filters are utilized, each filter picks up only a single frequency or a narrow frequency band (similar to the cilia in the human ear). Consequently, there is at each point in time the frequency and the amplitude value at this frequency. The number n can assume different values according to the end device properties. The greater n is, the better the audio signal can be reproduced. n is consequently a parameter with which the quality of the audio transmission can be scaled.

The amplitude values are placed into intermediate storage in the fields of a two-dimensional array.

The first dimension of the array corresponds to the time axis and the second dimension to the frequency. Therewith every sampled value with the particular amplitude value and phase is unambiguously determined and can be stored in the associated field of the array as an imaginary number. The voice signal is consequently represented in three acoustic dimensions (parameters) in the array: the time for example in milliseconds (ms), perceptually discerned as duration as the first dimension of the array, the frequency in Hertz (Hz), perceptually discerned as tone pitch, as the second dimension of the array and the energy (or intensity) of the signal, perceptually discerned as volume or intensity, which is stored as a numerical value in the corresponding field of the array.

In comparison to the applications DE 101 13 880.6 and DE 101 52 612.1, the frequency corresponds for example to the image height, the time to the image width and the amplitude of the audio signal (intensity) to the color value.

Similar to the method of the prioritizing of pixel groups in image/video coding, groups are formed of adjacent values and these are prioritized. Each field, considered by itself, together with at least one, preferably however several adjacent fields form one group. The groups are comprised of the position value, defined by time and frequency, the amplitude value at the position value, and the amplitude values of the allocated values corresponding to a previously defined form (see FIG. 2 of applications DE 101 13 880.6 and DE 101 52 612.1). Especially those groups receive a very high priority which are close to the current time and/or whose amplitude values, in comparison to the other groups, are very large and/or in which the amplitude values within the group differ strongly. The pixel group values are sorted in descending order and stored or transmitted in this sequence.

The width of the array (time axis) preferably has only a limited extent (for example 5 seconds), i.e. only signal sections of, for example, 5 seconds length are always processed.

After this time (for example 5 seconds) the array is filled with the values of the succeeding signal sections.

The values of the individual groups are received in the receiver according to the above described prioritization parameters (amplitude, closeness of position in time and amplitude differences from adjacent values).

In the receiver the groups are again entered into a corresponding array. According to patent applications DE 101 13 880.6 and DE 101 52 612.1, subsequently from the transmitted groups the three-dimensional spectral representation can again be generated. The more groups were received, the more precise is the reconstruction. The not yet transmitted array values are calculated by means of interpolation from the already transmitted array values. From the thus generated array, subsequently in the receiver a corresponding audio signal is generated which subsequently can be converted into sound.

For the synthesis of the audio signal for example n frequency generators can be utilized, whose signals are added to an output signal. Through this parallel structuring of n generators good scalability is attained. In addition, the clock rate can be drastically reduced through parallel processing, such that, due to a lower energy consumption, the playback time in mobile end devices is increased. For parallel application for example FPGAs or ASICs of simple design can be employed.

The described method is not limited to audio signals. The method can be effectively applied in particular where several sensors (sound sensors, light sensors, tactile sensors, etc.) are utilized, which continuously measure signals which subsequently can be represented in an array (of nth order).

The advantages compared to previous systems reside in the flexible applicability in the case of increased compression rates. By utilizing an array which is supplied from different sources, the synchronization of the sources is automatically obtained. The corresponding synchronization in conventional methods must be ensured through special protocols, or measures. In particular in video transmission with long propagation times, for example satellite connections, where sound and image are transmitted across different channels, frequently a lacking synchronization of the lips with the voice is noticeable. This can be eliminated through the described method.

Since the same fundamental principle of the prioritizing pixel group transmission can be utilized in voice, image and video transmission, a strong synergy effect is utilizable in the implementation. In addition, in this way the simple synchronization between language and images can take place. In addition, there could be arbitrary scaling between image and audio resolution.

If an individual audio transmission according to the new method is considered, in terms of voice a more natural reproduction results, since the frequency components (groups) typical for each human being are transmitted with highest priority and therewith free of loss.

The invention claimed is:

1. Method of transmitting audio signals between a transmitter and at least one receiver, comprising the steps of:

(a) resolving an audio signal into a number n of spectral components through a number n of frequency selective filters;

(b) storing the resolved audio signals in a two-dimensional array having a multiplicity of fields, and wherein frequency and time are stored as dimensions of the array and the amplitude as a particular value to be entered in a field within the multiplicity of fields of the array;

(c) combining each field of the multiplicity of fields into a field group wherein there are a plurality of field groups formed from the multiplicity of fields, and each field group is formed from at least three adjacent fields;

(d) assigning a priority to each group of the plurality of field groups, the priority of one group over another group becoming greater based upon at least the function of the greater the amplitude differences of the values of a group (e) sorting the field groups of said array with the aid of their priority value;

(f) storing and/or transmitting the groups to the at least one receiver in the sequence of their priority; and (g) transmitting said audio signals at low transmission bandwidths so as to minimize transmission losses.

2. Method as claimed in claim 1, characterized in that the entire audio signal exists as an audio file and is processed and transmitted in its entirety.

3. Method as claimed in claim 1, characterized in that only a portion of the audio signal is processed and transmitted in each instance.

4. Method as claimed in claim 1, characterized in that the audio signal is resolved into its spectral components by means of FFT.

5. Method as claimed in claim 1, characterized in that in the receiver the groups transmitted in accordance with their priority are assigned to a corresponding array, the values of the array still to be transmitted being calculated through interpolation from the already available values.

6. Method as claimed in claim 1, characterized in that from the existing and calculated values in the receiver an electric signal is generated and converted into an audio signal.

7. The method of claim 1, wherein said assigning step further comprises assigning a priority to each group of the plurality of field groups, the priority of one group over another group becoming greater based upon utilization of one or more functions selected from the group comprising:

(i) the greater the amplitudes of the group's values; and/or (ii) the closer the group is to the current time.

8. The method of claim 1, wherein said transmission step further comprises transmitting individual frequency components, wherein said individual frequency components further comprise amplitudes and phases.

9. Method of transmitting signals between a transmitter and at least one receiver, comprising the steps of:

(a) resolving a signal into a number n of spectral components though a number n of frequency selective filters;

(b) storing the resolved signals in a two-dimensional array having a multiplicity of fields, and wherein frequency and time are stored as dimensions of the array and the amplitude as a particular value to be entered in a field within the multiplicity of fields of the array;

(c) combining each field of the multiplicity of fields into a field group wherein there are a plurality of field groups formed from the multiplicity of fields, and each field group is formed from at least thee adjacent fields;

(d) assigning a priority to each group of the plurality of field groups, the priority of one group over another group becoming greater based upon at least the function of the greater the amplitude differences of the values of a group;

(e) sorting the field groups of said array with the aid of their priority value;

(f) storing and/or transmitting the groups to the at least one receiver in the sequence of their priority; and (g) transmitting said signals at low transmission bandwidths so as to minimize transmission losses.

* * * * *